US008749344B2

(12) United States Patent
Brunetti

(10) Patent No.: US 8,749,344 B2
(45) Date of Patent: Jun. 10, 2014

(54) EXIT LANE MONITORING SYSTEM

(76) Inventor: Sam F Brunetti, Arlington, VA (US)

( * ) Notice: Subject to any disclaimer, the term of this patent is extended or adjusted under 35 U.S.C. 154(b) by 217 days.

(21) Appl. No.: 13/344,333

(22) Filed: Jan. 5, 2012

(65) Prior Publication Data

US 2013/0021136 A1 Jan. 24, 2013

Related U.S. Application Data

(60) Provisional application No. 61/430,239, filed on Jan. 6, 2011.

(51) Int. Cl.

| | |
|---|---|
| ***E05B 45/06*** | (2006.01) |
| ***G08B 23/00*** | (2006.01) |
| ***G05B 19/00*** | (2006.01) |
| ***A47L 17/08*** | (2006.01) |

(52) U.S. Cl.

USPC ............ 340/5.7; 340/542; 340/573.1; 15/215

(58) Field of Classification Search

USPC ........................... 340/5.7, 542, 573.1; 15/215

See application file for complete search history.

(56) References Cited

U.S. PATENT DOCUMENTS 5,333,410 A * 8/1994 Tetherton .......................... 49/35
5,845,692 A * 12/1998 Kellem et al. ................. 160/118
5,982,125 A * 11/1999 Ranaudo et al. .............. 318/466
6,154,133 A 11/2000 Ross et al.
6,297,739 B1 * 10/2001 Small ......................... 340/573.3
6,418,235 B1 * 7/2002 Morimoto et al. ............ 382/118
6,507,278 B1 1/2003 Brunetti et al.
6,707,386 B1 * 3/2004 Pruisner ........................ 340/665
6,720,874 B2 * 4/2004 Fufido et al. .................. 340/541
6,744,369 B2 * 6/2004 Sata ........................... 340/573.1
6,896,388 B2 * 5/2005 George et al. ................... 362/84
7,600,129 B2 10/2009 Libin et al.
7,716,486 B2 5/2010 Libin et al.
7,822,989 B2 10/2010 Libin et al.
7,845,115 B2 * 12/2010 Ponert et al. ....................... 49/47
7,893,811 B2 * 2/2011 Augustyniak et al. ....... 340/5.52
8,015,597 B2 9/2011 Libin et al.
2003/0167693 A1 * 9/2003 Mainini ............................ 49/28
2005/0044402 A1 2/2005 Libin et al.
2009/0324010 A1 * 12/2009 Hou ............................ 382/103
2010/0302048 A1 * 12/2010 Mahajan ....................... 340/605
2011/0007139 A1 * 1/2011 Brunetti .......................... 348/51
2011/0234794 A1 9/2011 Tian et al.
2011/0313893 A1 12/2011 Weik, III

FOREIGN PATENT DOCUMENTS

JP 2008191970 A * 8/2008

* cited by examiner

*Primary Examiner* — George Bugg
*Assistant Examiner* — Munear Akki
(74) *Attorney, Agent, or Firm* — Polster, Lieder, Woodruff & Lucchesi, L.C.

(57) ABSTRACT

An exit lane monitoring system (10) detects wrong-way movement through a passage (P) between a secure area and a public area. Heel before toe sensors (12) are positioned on the floor of the passage and detect the foot pressure exerted by people moving through the passage from the secure area toward the public area and of persons moving the wrong way through the passage. Positioning of the sensors in the passage depends upon the geometry of the passage so sensors may be oriented in a non-geometric pattern if so dictated by the passage's geometry. A door (D) is selectively operated to block the passage and prevent persons moving the wrong way through it from entering the secure area. A control unit (16) is responsive to a sensor indication that someone is moving the wrong way to activate the door to block the passage and prevent movement into the secure area.

20 Claims, 5 Drawing Sheets

EXIT LANE MONITORING SYSTEM

CROSS REFERENCE TO RELATED APPLICATIONS

U.S. provisional patent application 61/430,239 filed Jan. 6, 2011.

STATEMENT REGARDING FEDERALLY SPONSORED RESEARCH OR DEVELOPMENT

None

BACKGROUND OF THE INVENTION

This invention relates to security in access controlled areas in venues such as airports and government offices; and, more particularly, to a detection system in combination with a deterrent system which completely restricts travel in one (the wrong) direction while allowing free access in the opposite (secure side to public side) direction.

In many venues, particularly airports and the like, it is not only desirable, but mandatory that access into secure areas (e.g., an airport concourse) be rigidly controlled so that only people who have passed through some type of screening procedure are allowed into the secure area. Using the airport example, people who have passed the screening procedure are allowed to enter the secure area through one passage (entry lane); while, those leaving the secure area are directed out of the area through a separate passage (exit lane). To prevent unscreened individuals from entering the secure area through the exit passage, guards are typically stationed at, or in, the passage to stop their movement. In addition, security systems have been installed to monitor the exit lane. These systems employ a variety of detection schemes and apparatus to detect a person going through the passage the wrong way, as early as possible in their movement into the passage, to timely alert security personnel as to the detected movement, and to block the passage so the intruder cannot pass through it into the secure area.

Some of these systems have been found to be more effective than others, but none have proved flawless. Again using the airport example, if someone does succeed in entering the concourse the wrong way, the concourse must be shut down, everyone evacuated; and, once the intruder is found, everyone rescreened before they can re-enter the concourse. This is not only time consuming and expensive, but results in a great deal of aggravation and hard feelings on the part of those simply trying to catch an airplane.

In addition, placing one or more guards in the exit lane is costly. Guards are typically stationed in the passage for certain period of time and are periodically relieved for rest or other duties. The result is in having to hire, train, and pay a number of people just to guard the exit.

The Transportation Safety Administration (TSA) has conducted a number of studies related to this problem. To date, none of the studies have demonstrated a truly satisfactory solution to the problem of exit lane breach control (ELBC). The studies have shown, for example, that doors positioned in the exit and which open and close to provide or block access through the lane are too slow to close in time to prevent an intruder from slipping through the door before it closes, or from catching the door before it closes and holding it open long enough to pass through it. Gates have been found to have too many safety issues associated with them to be operable in a way that they can be rapidly closed without potentially harming people in the exit passage. Turnstiles do not provide sufficient throughput, as well as having too large a footprint to comply with fire/safety codes for the exit lane volume they are required to handle.

Current detection systems employ closed circuit television (CCTV), intelligent CCTV (ICCTV), video analytics (VA), intelligent video motion analysis (IVMA), and stereo-optic CCTV (SoCCTV) among others. All of these various systems require a camera or sensor to see a monitored area. Further, to be effective, the entire monitored area must have no blocked areas or blind spots. Another drawback is the amount of processing and data storage capability required for the system and which imposes a substantial cost on system implementation.

Further, while these detection systems do detect intruders or wrong-way travelers, effectively implementing them is difficult to do, as there are many different intrusion scenarios which can cause the system to fail. Another problem with them is that even though they are capable of detecting the violation, they need to be integrated with a deterrent or capture system that can operate rapidly enough to prevent the intruder from entering the access controlled space.

BRIEF SUMMARY OF THE INVENTION

The present disclosure is directed to an exit lane monitor system (ELMS) which effectively secures an exit from a breach on the public side of the passage while allowing the free egress of people from the secure side.

The system employs a plurality of heel before toe pressure (HBTP) sensors, appropriately positioned along an exit lane. The sensors monitor the movement of people through the exit lane and immediately detect when someone is moving in the wrong direction through the lane. Sensor outputs are provided to a controller for a door control system which selectively allows people to move through the exit lane, or blocks their passage. The controller is responsive to an input from a sensor that someone is moving through the passage in the wrong direction to close the passage and block movement in either direction through it.

An HBTP sensor mat detects wrong way movement regardless of whether a person is walking forwardly through the passage but in the wrong direction, or is walking backwardly through the passage, or is crawling through the passage. The sensors are further capable of detecting simultaneous movement of more than one person moving through the passage in the correct direction while still detecting someone (an intruder) moving in the wrong direction through it.

The ELMS may include a time "window". This window provides a brief interval between when wrong way movement is detected and the passage is blocked. This provides for the situation where a person inadvertently moves in the wrong direction through the passage, but then stops, reverses their direction, and begins moving in the right direction through it.

The ELMS further includes a video camera or sensor to record movement through the passage and to capture and store video of incidents of wrong-way movement for possible subsequent use against an intruder.

The ELMS is readily installed in any exit lane, regardless of its configuration or geography, and once installed, senses movement throughout the exit lane, regardless of whether portions of the passage are not readily visible to cameras or video sensors.

Other objects and features will be in part apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figure 1:
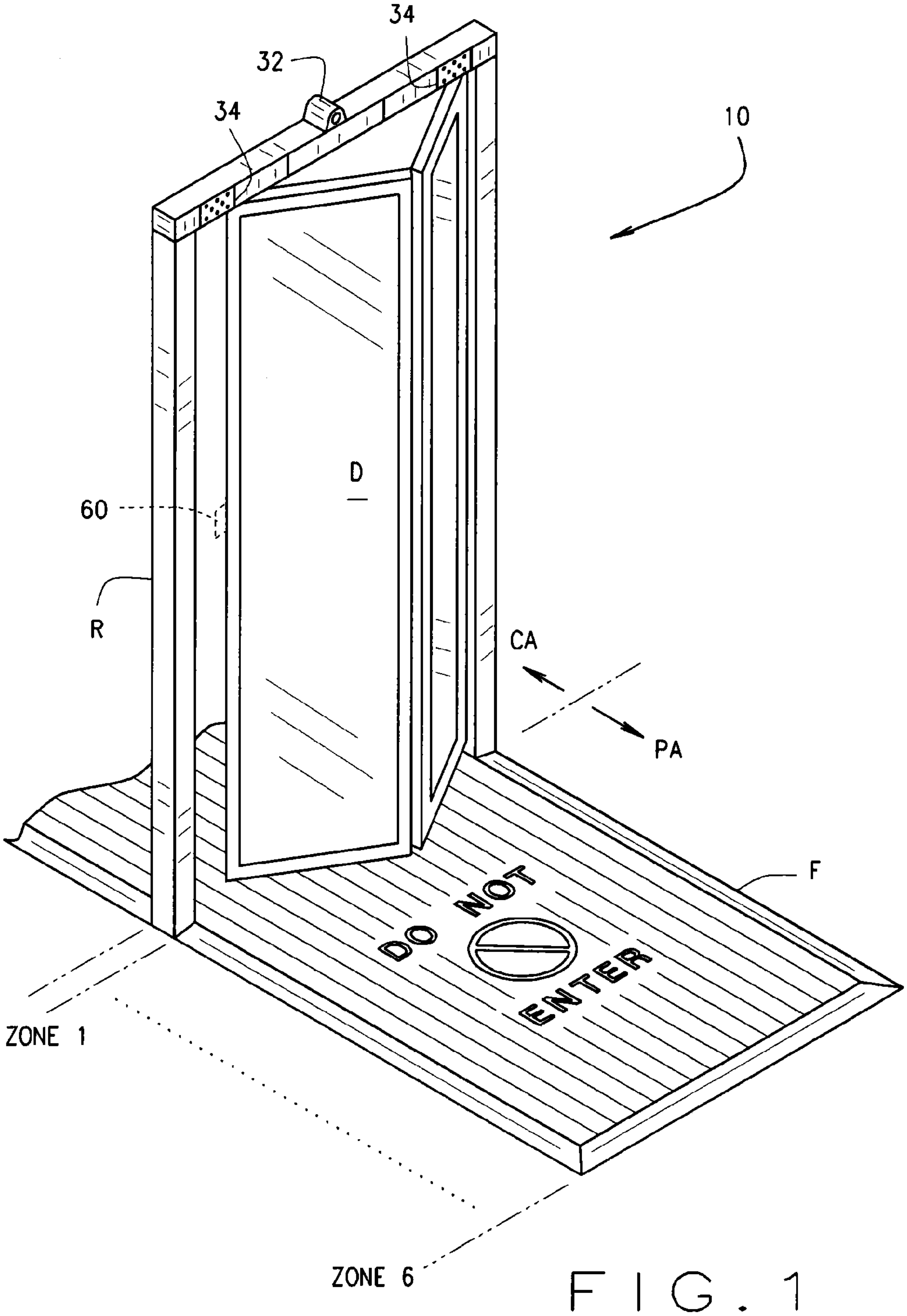
FIG. 1 is a perspective view of one embodiment of an exit lane monitoring system of the present invention.
Figure 3A:
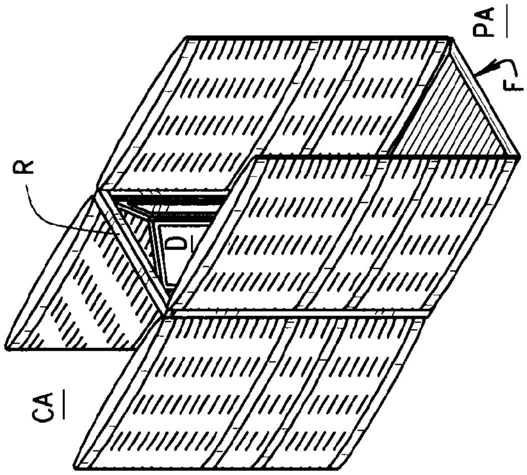
FIG. 3A is a perspective view illustrating a partially open door, and FIG. 3B a fully opened door.
Figure 3B:
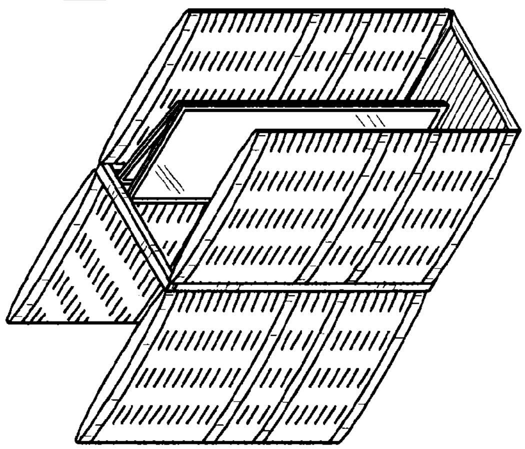

The following detailed description illustrates the invention by way of example and not by way of limitation. This description clearly enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Figure 6:
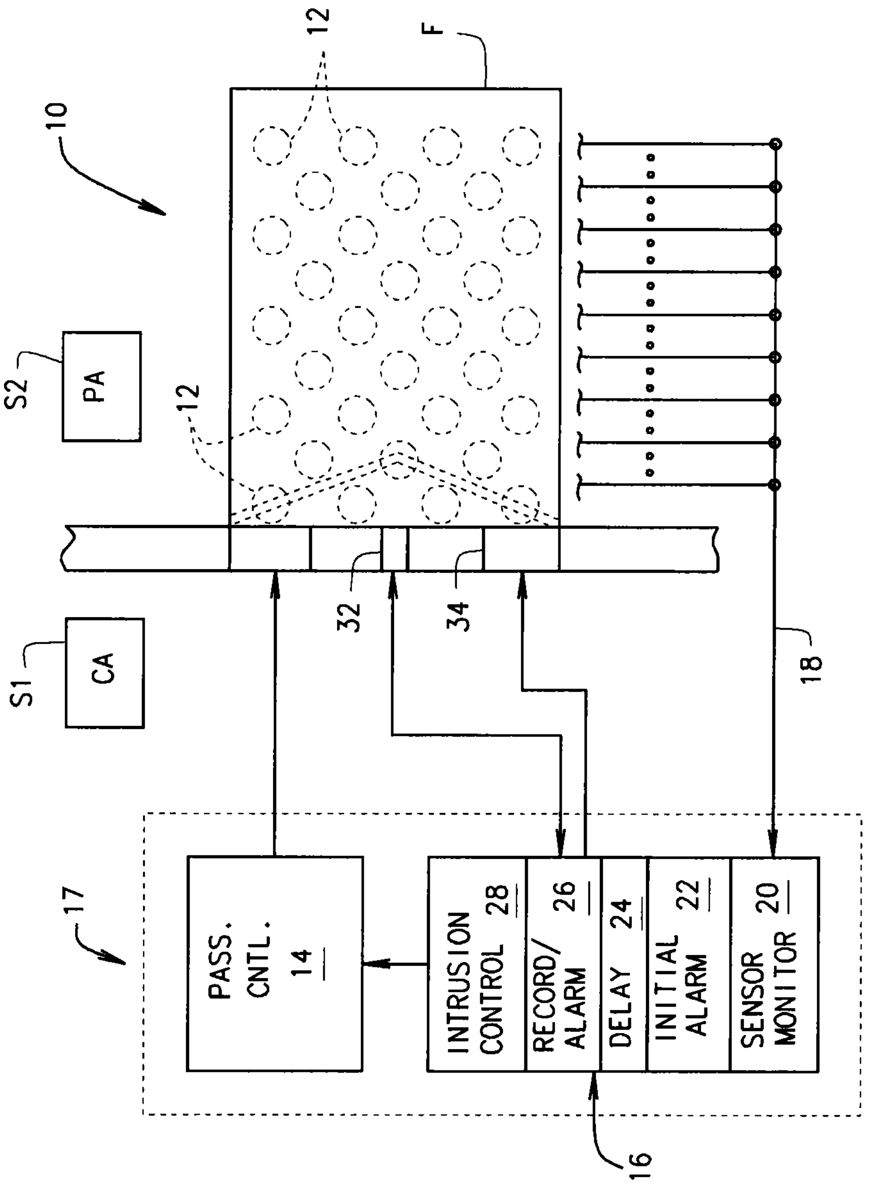

Referring to the drawings, an exit lane monitoring system (ELMS) for detecting and blocking wrong-way movement through a passage P between an access-controlled area or secure CA and a public or non-secure area PA is indicated generally 10 in the drawings. ELMS 10 first includes at least one, and preferably a plurality of heel before toe pressure (HBTP) sensors (including sensor mats) 12. These are positioned on the floor F of passage P as shown in FIG. 6. The sensors detect the foot pressure exerted by people moving through passage P from access-controlled area CA into public area PA, and persons moving in the opposite, wrong way, direction through the passage from the public area toward the access-controlled area. A passage control means 14 selectively blocks passage P to prevent persons moving through the passage the wrong way so they are prevented from entering access-controlled area CA from public area PA through the passage. Passage control means 14 accomplishes this by the opening and closing of a door (or doors) D which is installed across passage P. Each door D which, for example, is a bi-fold door is installed in a frame R.

Regarding the sensors or sensor mat 12, HBTP is a detection technology and process which together comprise the foundation of ELMS 10. As previously discussed, there are many environments (i.e., airports) where there is a need to ensure flow of people in a single direction within a corridor, area or passageway, and to prevent anyone from entering the area from another direction. HBTP ensures the unidirectional flow of physical traffic via exit passage P, where any movement "against" traffic is immediately detected and alarmed, as well as secured in certain circumstances.

HBTP is based on the principle that a person's walking/running stride and foot prints (whether the person is barefoot or in foot ware) have characteristics that are physically and logically measured and evaluated for conformity to expected patterns when an individual is traversing a HBTP sensor mat 12. Where the actual pattern of movements falls outside the expected norms, as detected by mat 12, ELMS 10 goes into an alarm and/or secure mode of operation so that the anomaly (person traveling the wrong way) can be immediately addressed by other monitoring or security systems, and/or security personnel.

In a normal walking or running stride, the heel of a person's foot comes into contact with the floor first, followed almost immediately (in a rolling or wave pattern) by the ball of the foot, and finally by the toes. The heel, the ball of the foot and the toes together form the entire footprint area, and a second pattern of a similar rolling nature is made slightly ahead of, and to the side of the initial footprint, by the person's other foot as they continue their stride.

This rolling action of an individual's stride is referred to as a foot pressure wave (FPW), and the directional orientation of the FPW is read by HBTP sensors or sensor mat 12 to determine the direction of the person's movement. Furthermore, the mat detects the size and impact pressure of the footprint's components—heel, ball and toes—relative to one another at additional data points that make up what is referred to as a hard impact area (HIA). Together these generally conform to expected patterns that verify the impression was a) made by a foot and b) the stride direction. Typically, the heel imprint is smaller in area than the total combined area covered by the ball of the foot and the toes. This is what HBTP mat 12 detects. Further, the impact pressure associated with the heel is almost always greater than the combined impact pressure of the ball and toes. Together these data points make up the HIA inputs and are used to determine the direction of the walker.

It has been found that these principles of FPW and HIA hold, even where:

- The impression being read is one made by a woman's high heel shoe
- The impression is made by someone running or jumping across the mat
- Someone attempts to fool the ELMS by walking backwards (HBTP mat 12 will produce an alarm when HIA data contradicts FPW data and direction)
- Someone tries to tip-toe to confuse HBTP (HIA data will be outside expected norms, causing an alarm)
- A person is using a cane or crutches, is in a wheelchair, or is accompanied by an animal companion (HBTP has a set of pressure wave and impact pressure and directional flow profiles that can interpret these expected variations to FPW and HIA).

HBTP mat 12 is used with algorithms to create profiles that interpret the weight, size, gender and age of people associated with different FWPs, HIAs, strides and speeds. This HBTP information is used to prioritize potential threats as indicated by alarms, can help guide alarm response decision-making, and may reduce the amount of time from when an alarm event begins to a system 10 response.

HBTP mat 12 is typically comprised of hundreds of individual sensors that in ELMS 10 will cover the entire width and length of passage P. The entire HBTP area can also be divided into sensor groups or zones to provide another step data parameter for HBTP to monitor. This is accomplished using a stand-alone algorithm that locates any given step in the overall "geography" of ELMS 10. This zone approach to step monitoring means HBTP can simply use a step's location along with FWP to make a threat determination for alarm purposes. For example, and as shown in FIG. 1, if a Zone 1 is the first zone that exiting individuals are expected to step onto, and Zone 6 is the last zone they should be walking through as they leave ELMS, any FWP that begins in Zone 6 will be read by ELMS 10 as encroachment from the public side of the ELMS and will trigger an alarm.

Use of HBTP in ELMS 10 eliminates problems associated with other detection and deterrent technologies. For example:

1. Video analytics can have blind spots that are used to avoid detection. There are no "islands" of unprotected walkway with HBTP.
2. Microwave systems require as much as 12 feet forward of any secure door or opening, and are susceptible to public cross traffic. HBTP covers only the area to be controlled and can be programmed to significantly limit the number of false alarms.
3. Hard egress points like security turnstiles require too large a footprint and reduce throughput to unacceptable levels. HBTP does not physically constrict foot traffic but can be used in conjunction with desired exit control portals.
4. Security doors can impact both fire and life safety codes when they stop all exiting traffic while an alarm or violation is in progress. HBTP zones can independently protect multiple exit openings so that a breach in one can be programmed to shut and lock an individual door while leaving all other doors in service for continued egress.

The multi-level detection capabilities of ELMS 10 are unique and extremely valuable in securing exit passageways regardless of size of the area to be monitored and the number of people exiting. The HBTP system's capabilities to continuously and simultaneously detect, measure, cross-reference and evaluate many different elements of simple step information—including, but not limited to, impact area and pressure, directional movement, stride parameters, zone impacts, profile analysis—mean exit lanes such as passage P can finally be secured with confidence.

A control means 16 of ELMS 10 is responsive to a sensor 12 indication of wrong way movement through the passage to activate passage control means 14 for the control means to block the passage and prevent movement of the person into the access-controlled area.

Although passage P is shown in the drawings to be generally rectangular in shape, in many installations, the passage is anything but. It is often the situation, particularly where existing corridors or passages are converted from some other use to a passage P, that the passage is a curved passage, or widens at some parts and narrows at others. Accordingly, the passage shape shown in the drawings is representative only. It will therefore be understood by those skilled in the art that the sensors or sensor mats 12 will often be configured in a non-geometric pattern as dictated by the geometry of the passage. However, it will further be understood by those skilled in the art that the layout pattern of the sensors has no effect on the overall performance of system 10.

Regardless of the installation, each sensor 12 separately detects the foot pressure exerted by people moving through the passage in either direction. Further, each sensor detects the foot pressure of a person walking, running, or crawling through the passage P in either a forward, backward, sideways, or diagonal direction. As shown in FIG. 6, outputs from each sensor 12 are provided to control means 16 through input lines 18 to a sensor monitor 20 of the control means. The sensor input to the monitor is, for example, one signal when the person is moving through the passage from the access controlled area into the public area, but a different signal when the person is moving in the opposite, wrong-way direction through the passage.

When monitor 20 receives an input indicating wrong-way movement, it provides an output to an initial alarm module 22. Module 22 is responsive to this indication to alert recording and alarm equipment, which is controlled through a module 26, and an intrusion control 28.

It will be understood by those skilled in the art that simply because one moves the wrong way through passage P does not mean the person is attempting to intrude into controlled access area CA. If, for example, someone drops something (paper, book, purse, piece of luggage, etc.) they may have to turn back through the passage to retrieve it. Once they do, they then proceed on into public area CA. Or, someone may stop to wait for a fellow traveler and pace back and forth in the passage until that person joins them, at which time both proceed on into the public area. Or, the person may just inadvertently turn around in the passage and move back toward the access controlled area.

Accordingly, rather than immediately triggering an alarm and blocking passage P each time a sensor signal indicating wrong-way movement is generated, control means 16 includes an optional built in delay 24. Delay 24 has two components: first a time delay which is adjustable based upon the particular installation. This takes into account, for example, the length of passage P. The second delay is a spatial delay. That is, it is one thing if a person at the far end of the passage (i.e., almost in the public area) turns back down the passage; but another, if the person is barely into the passage. In the first instance, it will take longer for the person to move back to the controlled access area than for the second person to do so. Therefore, any built in delay may be shorter for the second situation than the first.

Figure 5A:
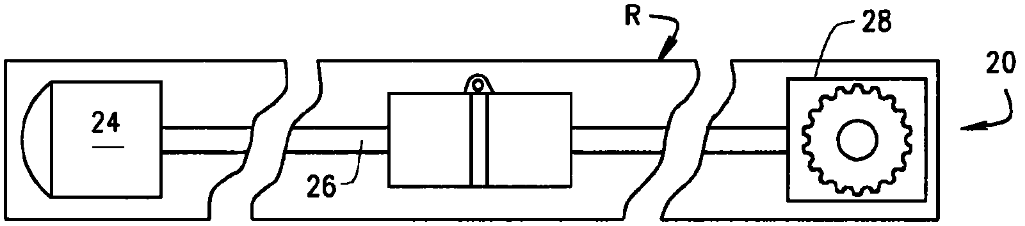
FIG. 5A is a top view (partially broken) of a door locking mechanism for controlling operation of a door of the system.
Figure 5B:
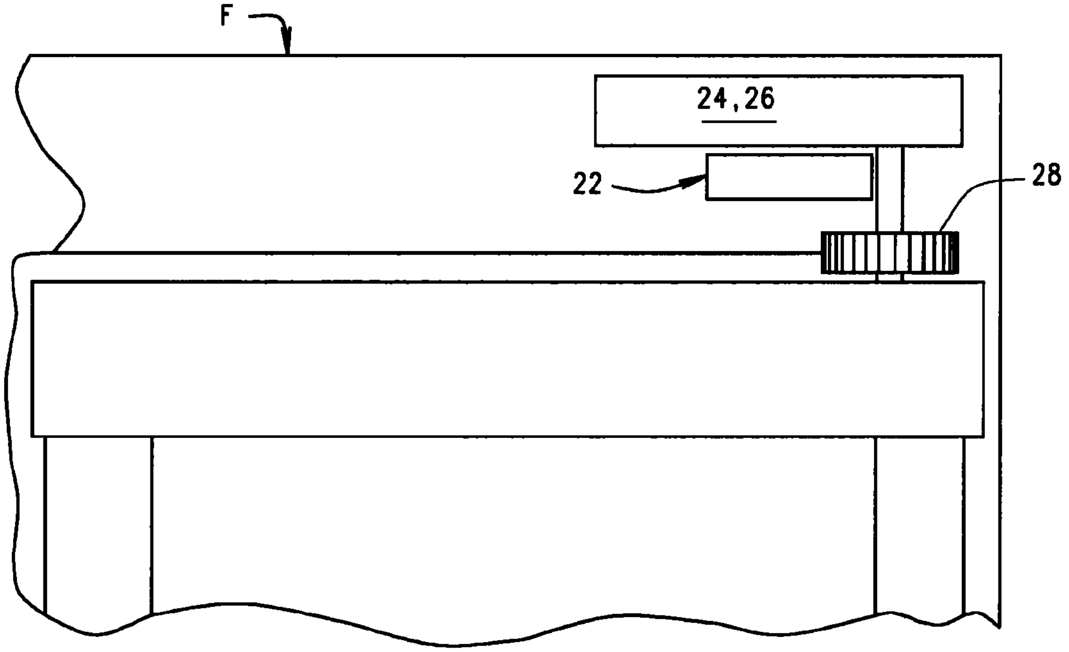
FIG. 5B is an elevation view of the mechanism.
Figure 5C:
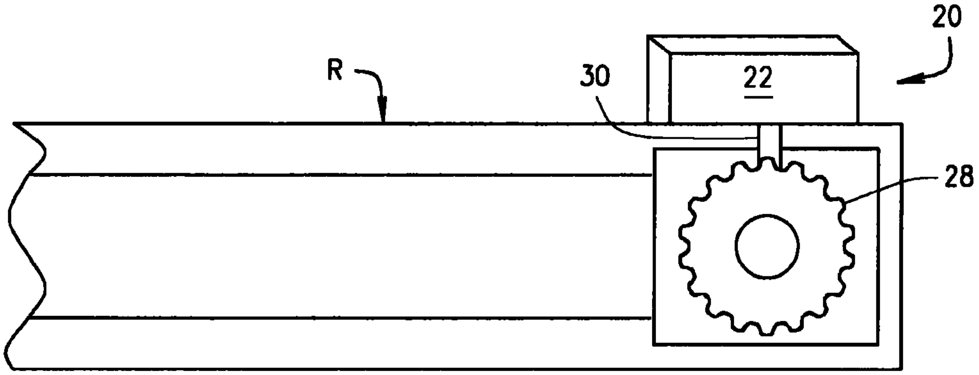
FIG. 5C is a side view of the mechanism; and, FIG. 6 is a simplified block diagram of the system.

When a wrong-way violation is detected, control means 16 performs a number of functions. One is to send a door closure signal to passage control means 14 to close and lock door D. As shown in FIGS. 5A-5C, built into a header of frame R of door D is an opening and closing mechanism 20 and a locking mechanism 22. Mechanism 20 includes a reversible motor 24, a drive shaft 26 coupled to the motor, and a gear 28 driven by the shaft to respectively open and close the door. Locking mechanism 24 includes a blocking pin 30 movable into contact with the teeth of gear 28 to block rotation of the gear and lock door D in place. Once locking mechanism 22 is activated by passage control means 14, door D remains locked in place until control means 16 resets passage control means 14. It will be understood by those skilled in the art that the mechanism described is exemplary only and that other door opening and closing and door locking mechanisms can be implemented without departing from the scope of the invention. For safety purposes, and as shown in FIG. 1, at least one sensor 60 is located on door frame R. The sensor is responsive to a person being contacted by door D, as it is closing, so to stop closing movement of the door and prevent injury to the individual. If passage P has more than one door D, then there is at least one sensor 60 mounted to the frame of each door.

In addition to activating passage control means 14, control means 16 simultaneously activates a camera 32 and a video system (which is part of module 26) for recording and storing video imagery of the incident of wrong way movement. As shown in the drawings, camera 32 is mounted above the door frame header and oriented to capture movement through passage P. Once activated, the camera continues capturing video imagery until turned off by control means 16.

An audio alarm is also activated by control means 16. A speaker 34 is installed on the right-hand end of the door frame header, on the public area side only. The audio alarm alerts people in passage P, or preparing to pass through door D that the door is being closed, or is closed. It can further play a warning to the person(s) approaching the access controlled area that they are moving in the wrong direction through passage P and should turn around and go back through the passage. As with camera 32, the alarm continues to be played until deactivated by control means 16. Additionally, an intercom speaker 34A is located on the left-hand side of the frame header, again on the public area side. This speaker is used to open a bi-directional channel of communications between a remotely located operator and the individual whose wrong way movement through the passage has set-off the alarm.

As noted, control means 16 includes a reset capability for releasing passage control means 14 to unblock passage P once a wrong-way movement incident has been reconciled. This reset feature is either manually operated, or is responsive to a reset command from a remote command center, to release the passage control means.

The components comprising means 14 and 16 are incorporated in an operator alarm kiosk system (OAKS) 17. This system provides a security staff the ability to monitor a door D for intrusions and functionality from a remote location. One kiosk can monitor a plurality of door modules located in the same exit area or different door modules located in different exit locations. A security person has the ability, through the OAKS 17, to view the general event camera for any door to monitor traffic throughput or the status of events associated with the exit lane the camera is viewing.

As described above, in the event of an intrusion or alarm, OAKS 17 alerts security staff personnel with an audio/visual annunciation, and records the intrusion attempt. Again, this includes both pre-alarm and post-alarm video. The video plays in a continuous lop until an operator acknowledges the event and takes control of the video in order to manipulate the frames to find the one with the best facial view of the intruder. This frame is then printed.

An intercom is also activated by the alarm. A communications channel to the door at the end of the passage through which the intruder is proceeding is automatically opened so the operator can now directly communicate with the intruder. This allows the operator to command the intruder to step away from the door, and give any other necessary instructions. Once the breach condition is over, the operator resets the door module (unlocks the door) and puts the exit lane back into service. This action includes deactivation of all the audio and visual alarms and returning them to their pre-intrusion status.

Figure 2:
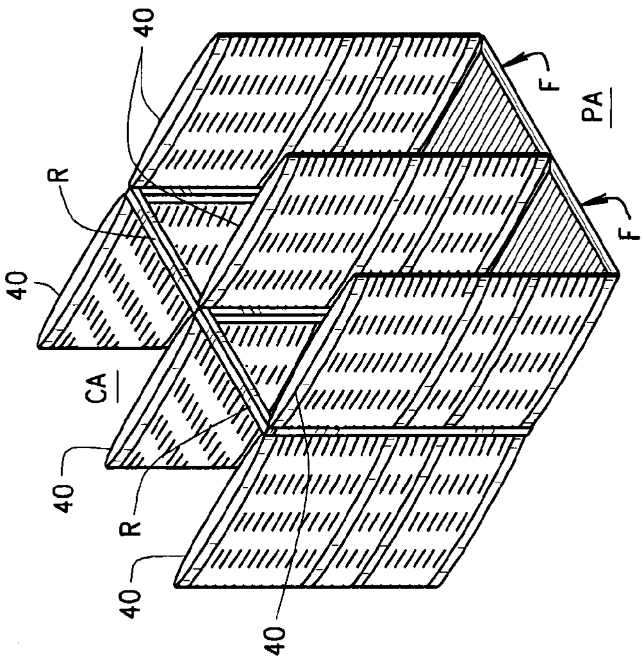
FIG. 2 is a perspective view of a second embodiment of the system featuring dual doors with perforated guide panels.
Figure 4C:
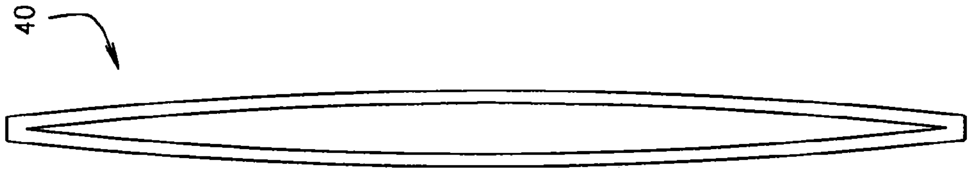
FIGS. 4A-4C are respective side, front, and top views of a passenger guide panel.
Figure 4B:
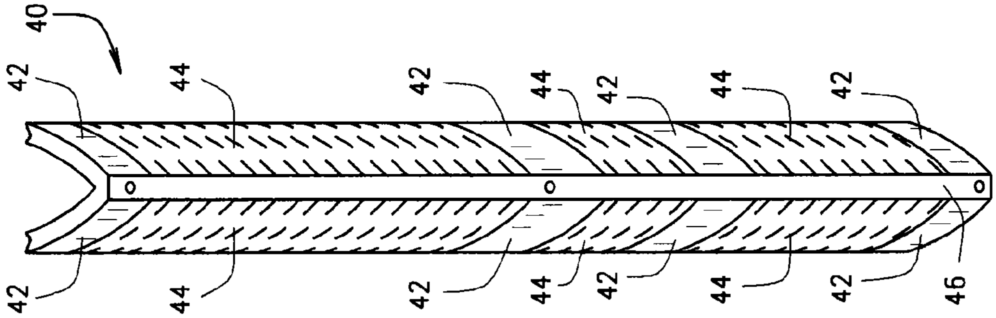
Figure 4A:
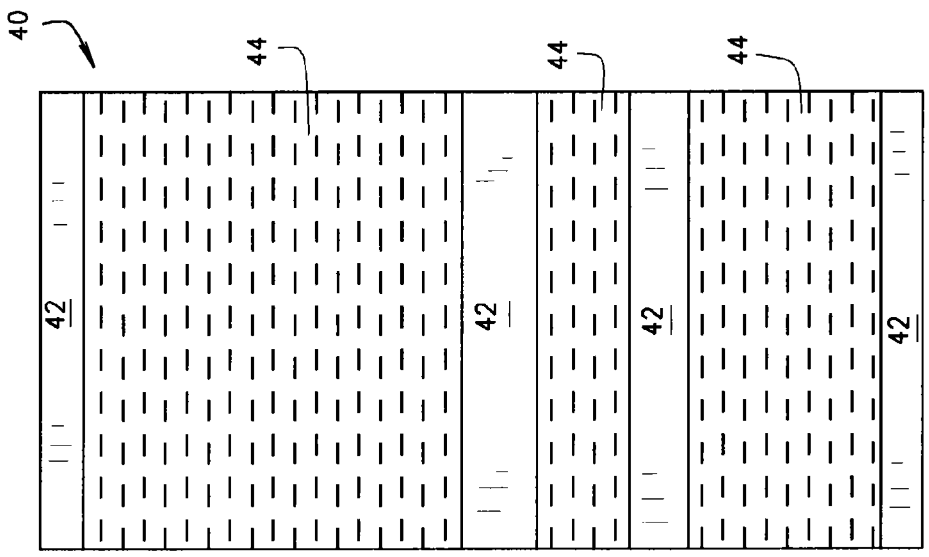

Next, as shown in FIGS. 4A-4C, passenger guide panels 40 are used to control the movement of people into, and through passage P, particularly when there are a number of doors D by which people enter the passage from its access controlled area end. As shown in FIG. 2, the panels 40 are placed both before and after a door D, so to define a pathway up to, through, and past a door D into the passage. In FIG. 4A, a panel 40 is shown to comprise alternating solid panels 42 and perforated panels 44. It will be noted from the drawings that viewing a panel "straight-on" gives one the optical illusion that the passage is narrower than the opening of door D. This feature is achieved by bowing each panel inwardly toward the center of the passage.

Finally, and as shown in FIG. 6, appropriate signage S1, S2 is displayed adjacent each end of passage P to inform travelers as to whether they are in a controlled access area CA or public area PA. The signage may be in any convenient form including both physical signs and/or an electronic display.

In view of the above, it will be seen that the several objects and advantages of the present disclosure have been achieved and other advantageous results have been obtained.

Having thus described the invention, what is claimed and desired to be secured by Letters Patent is:

1. An exit lane monitoring system for detecting and blocking wrong-way movement of a person through a passage between an access-controlled area and a public area while allowing those people moving in the direction toward the public area unimpeded movement toward and into the public area, comprising:

at least one heel before toe sensor positioned on a floor of the passage intermediate the length of the passage, the sensor detecting the foot pressure exerted by people moving through the passage from the access-controlled area toward the public area and persons moving in a wrong way through the passage from the public area toward the access-controlled area, the sensor capable of detecting the wrong way movement of any person within a group of people simultaneously moving through the passage even though the other people in the group are properly moving from the access controlled area into the public area;

passage control means selectively blocking an entry from the passage into the access controlled area to prevent any person moving through the passage from the public area toward the access-controlled area entry into the access controlled area; and, control means responsive to a sensor indication that someone is moving through the passage from the public area toward the access-controlled area to activate the passage control means to block the entry from the passage into the access controlled area and prevent movement of that person into the access-controlled area.

2. The exit lane monitoring system of claim 1 further including a plurality of sensors positioned on the floor of the passage, each sensor separately detecting the foot pressure exerted by people moving through the passage in either direction.

3. The exit lane monitoring system of claim 2 in which each sensor detects the foot pressure of people moving through the passage by walking in either a forward, backward, sideways or diagonal direction.

4. The exit lane monitoring system of claim 1 in which the control means includes a delay means by which the passage control means is not immediately activated when wrong way movement through the passage is sensed, thereby to prevent blocking of the passage if the wrong way passage is inadvertent, not intentional, and the person moving the wrong way through the passage reverses their direction of movement and proceeds toward the public area.

5. The exit lane monitoring system of claim 4 further including a video system for recording an incident of wrong way movement, the video system being activated in response to an input from the control means that a wrong way movement has been detected.

6. The exit lane monitoring system of claim 5 further including an alarm activated in response to an input from the control means that a wrong way movement has been detected.

7. The exit lane monitoring system of claim 6 in which the alarm can be either an audio alarm or a video alarm, or both.

8. The exit lane monitoring system of claim 7 further including speaker means providing two-way communications with a person in the passage.

9. The exit lane monitoring system of claim 4 further in which the control means includes a reset means for releasing the passage control means and unblock the passage, the reset means being either manually operated, or responsive to a reset command from a command center to release the passage control means.

10. The exit lane monitoring system of claim 2 in which the positioning of the sensors in the passage is a function of the geometry of the passage so that sensors may be positioned in a non-geometric pattern if so dictated by the geometry of the passage.

11. The exit lane monitoring system of claim 1 in which the sensor further detects a person crawling through the passage in the wrong direction.

12. The exit lane monitoring system of claim 9 in which the passage control means includes a gear for moving the door in an opening or closing direction and a pin movable into and out of contact with gear to lock the door in place or allow it to open.

13. The exit lane monitoring system of claim 12 further including at least one sensor located on a frame of the door, the sensor being responsive to a person being contacting or being contacted by the by the door, as it is closing, so to stop closing movement of the door and prevent injury to the individual.

14. The exit lane monitoring system of claim 1 further including appropriate signage adjacent each end of the passage to inform travelers as to whether they are in a controlled access area or public area.

15. The exit lane monitoring system of claim 14 in which the signage comprises a physical sign or an electronic display.

16. A method of detecting wrong-way movement through a passage leading from a secure area to a non-secure area and blocking the passage when wrong-way movement of a person through the passage is detected while allowing those people moving in a direction toward the non-secure area unimpeded movement toward and entry into the non-secure area, comprising:

positioning heel before toe sensors on a floor of the passage intermediate the length of the passage, each sensor detecting the foot pressure exerted by a person moving through the passage in either direction and the sensors providing an indication when movement from the non-secure area toward the secure area is detected, the sensors capable of detecting wrong way movement of any individual within a group of people simultaneously moving through the passage even though the other people in the group are properly moving from the secure area into the non-secure area; and, in response to the sensors' indication, blocking an entry from the passage into the secure area to prevent a person moving through the passage from the non-secure area toward the secure area from entering the secure area.

17. The method of claim 16 in which blocking of passage in response to the sensors' indication includes a control means to which outputs from the sensors are supplied, and a barrier activated by the control means to block the passage and prevent movement of the person into the secure area.

18. The method of claim 17 in which each sensor separately detects the foot pressure exerted by people moving through the passage in either direction regardless of whether the person is moving forward, backward, sideways or diagonally through the passage, or is crawling through the passage.

19. The method of claim 17 in which the control means includes a delay means by which the barrier is not immediately activated when wrong way movement through the passage is sensed, thereby to prevent blocking of the passage if the wrong way passage is inadvertent, not intentional, and the person moving the wrong way through the passage reverses their direction of movement and proceeds toward the non-secure area.

20. The method of claim 17 in which the control means further includes a reset means for removing the barrier and opening the passage once a wrong-way movement incident through the passage has been reconciled.

* * * * *